US006977895B1

(12) United States Patent
Shi et al.

(10) Patent No.: US 6,977,895 B1
(45) Date of Patent: Dec. 20, 2005

(54) APPARATUS AND METHOD FOR RATE-BASED POLLING OF INPUT INTERFACE QUEUES IN NETWORKING DEVICES

(75) Inventors: Zhanhe Shi, San Jose, CA (US); Qingming Ma, Cupertino, CA (US); Saravanan Agasaveeran, Sunnyvale, CA (US); Steven H. Berl, Piedmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/533,517

(22) Filed: Mar. 23, 2000

(51) Int. Cl.$^7$ ............................................. H04J 1/16
(52) U.S. Cl. .................. 370/235; 370/401; 370/412; 370/449
(58) Field of Search ................... 370/229, 230, 370/232, 233, 234, 235, 238, 400, 401, 412–415, 370/429, 449, 468, 477, 428

(56) References Cited

U.S. PATENT DOCUMENTS

| | | | |
|---|---|---|---|
| 4,499,576 A | 2/1985 | Fraser | 370/60 |
| 4,507,760 A | 3/1985 | Fraser | 365/221 |
| 4,769,811 A | 9/1988 | Eckberg, Jr. et al. | 370/60 |
| 5,007,070 A * | 4/1991 | Chao et al. | 375/371 |
| 5,014,265 A | 5/1991 | Hahne et al. | 370/60 |
| 5,224,099 A | 6/1993 | Corbalis et al. | 370/94.2 |
| 5,249,178 A | 9/1993 | Kurano et al. | 370/60 |
| 5,268,900 A | 12/1993 | Hluchyj et al. | 370/94.1 |
| 5,271,004 A | 12/1993 | Proctor et al. | 370/60 |
| 5,311,509 A | 5/1994 | Heddes et al. | 370/60 |
| 5,313,454 A | 5/1994 | Bustini et al. | 370/13 |
| 5,317,562 A | 5/1994 | Nardin et al. | 370/16 |
| 5,359,592 A | 10/1994 | Corbalis et al. | 370/17 |
| 5,408,472 A | 4/1995 | Hluchyj et al. | 370/94.1 |
| 5,422,880 A | 6/1995 | Heitkamp et al. | 370/60 |
| 5,541,957 A | 7/1996 | Lau | 375/258 |
| 5,561,663 A | 10/1996 | Klausmeier | 370/17 |
| 5,570,360 A | 10/1996 | Klausmeier et al. | 370/60 |
| 5,570,361 A | 10/1996 | Norizuki et al. | 370/60.1 |
| 5,615,212 A * | 3/1997 | Ruszczyk et al. | 370/433 |
| 5,699,521 A | 12/1997 | Iizuka et al. | 395/200.15 |
| 5,734,654 A | 3/1998 | Shirai et al. | 370/396 |
| 5,765,032 A | 6/1998 | Valizadeh | 395/200.65 |
| 5,793,978 A | 8/1998 | Fowler | 395/200.56 |
| 5,799,040 A | 8/1998 | Lau | 375/258 |
| 5,802,047 A | 9/1998 | Kinoshita | 370/359 |
| 5,838,915 A | 11/1998 | Klausmeier et al. | 395/200.45 |
| 5,838,994 A | 11/1998 | Valizadeh | 395/876 |
| 5,889,963 A * | 3/1999 | Gopal et al. | 709/228 |
| 5,920,552 A * | 7/1999 | Allpress et al. | 370/335 |
| 5,922,051 A | 7/1999 | Sidey | 709/223 |
| 5,926,458 A | 7/1999 | Yin | 370/230 |
| 5,953,336 A | 9/1999 | Moore et al. | 370/395 |

(Continued)

OTHER PUBLICATIONS

McKeown et al., "*The Bay Bridge: A High Speed Bridge/ Router*", May 1992, IFIP PfHSN Workshop, Stockholm Sweden.

(Continued)

*Primary Examiner*—Huy D. Vu
*Assistant Examiner*—Daniel Ryman
(74) *Attorney, Agent, or Firm*—Thelen Reid & Priest LLP; David B. Ritchie

(57) ABSTRACT

The congestion control in a networking device having a plurality of input interface queues includes (a) estimating the data arrival rate on each of the plurality of input interface queues, and (b) determining, for each polling round, the sequence in which the plurality of input interface queues should be polled and the quantity of data to be processed from each of the plurality of input interface queues each time the input interface queue is polled, using the estimated data arrival rate on each of the plurality of input interface queues.

75 Claims, 8 Drawing Sheets

U.S. PATENT DOCUMENTS

| | | | |
|---|---|---|---|
| 5,974,033 A * | 10/1999 | Kamiya et al. | 370/230.1 |
| 6,018,770 A | 1/2000 | Little et al. | 709/223 |
| 6,049,549 A * | 4/2000 | Ganz et al. | 370/449 |
| 6,118,792 A * | 9/2000 | Beshai | 370/468 |
| 6,175,554 B1 * | 1/2001 | Jang et al. | 370/229 |
| 6,373,842 B1 * | 4/2002 | Coverdale et al. | 370/394 |
| 6,377,583 B1 * | 4/2002 | Lyles et al. | 370/412 |
| 6,438,141 B1 * | 8/2002 | Hanko et al. | 370/477 |
| 6,452,933 B1 * | 9/2002 | Duffield et al. | 370/415 |
| 6,490,248 B1 * | 12/2002 | Shimojo | 370/229 |
| 2002/0039369 A1 * | 4/2002 | Koo | 370/449 |

OTHER PUBLICATIONS

Chowdhury, Shyamal, "Alternative Bandwidth Allocation Algorithms for Packet Video in ATM Networks", 1992, IEEE, pp. 1061-1068.

Zhang, et al., "Rate-Controlled Static-Priority Queueing", 1993, IEEE, pp. 227-236.

* cited by examiner

APPARATUS AND METHOD FOR RATE-BASED POLLING OF INPUT INTERFACE QUEUES IN NETWORKING DEVICES

BACKGROUND OF THE INVENTION

1. Field of the Invention

The present invention relates to data communication networks. More particularly, the present invention relates to an apparatus and method for enabling rate-based polling of input interface queues in networking devices.

2. The Background Art

As is known to those skilled in the art, a network is a communication system that allows users to access resources on other computers and exchange messages with other users. A network is typically a data communication system that links two or more computers and peripheral devices. It allows users to share resources on their own systems with other network users and to access information on centrally located systems or systems that are located at remote offices. It may provide connections to the Internet or the networks of other organizations. The network typically includes a cable that attaches to network interface cards ("NICs") in each of the devices within the network. Users may interact with network-enabled software applications to make a network request (such as to get a file or print on a network printer). The application may also communicate with the network software, which may then interact with the network hardware to transmit information to other devices attached to the network.

FIG. 1 is a block diagram illustrating an exemplary network 100 connecting a user 110 and a particular web page 120. FIG. 1 is an example which may be consistent with any type of network known to those skilled in the art, including a Local Area Network ("LAN"), a Wide Area Network ("WAN"), or a combination of networks, such as the Internet.

When a user 110 connects to a particular destination, such as a requested web page 120, the connection from the user 110 to the web page 120 is typically routed through several internetworking devices such as routers 130-A–130-I. Routers are typically used to connect similar and heterogeneous network segments into internetworks. For example, two LANs may be connected across a dial-up, integrated services digital network ("ISDN"), or across a leased line via routers. Routers may also be found throughout internetwork known as the Internet. End users may connect to a local Internet service provider ("ISP") (not shown).

As shown in FIG. 1, multiple routes are possible to transmit information between user 110 and web page 120. Networks are designed such that routers attempt to select the best route between computers such as the computer where user 110 is located and the computer where web page 120 is stored. For example, based on a number of factors known to those skilled in the art, the route defined by following routers 130-A, 130-B, 130-C, and 130-D may be selected. However, the use of different routing algorithms may result in the selection of the route defined by routers 130-A, 130-E, 130-F, and 130-G, or possibly even the route defined by routers 130-A, 130-B, 130-H, 130-I, 130-F, and 130-G. A detailed discussion of routing algorithms is not necessary for the purposes of the present invention, and such a discussion is not provided here so as not to overcomplicate the present disclosure.

FIG. 2 is a block diagram of a sample router 130 suitable for implementing an embodiment of the present invention. The router 130 is shown to include a master control processing unit ("CPU") 210, low and medium speed interfaces 220, and high speed interfaces 230. The CPU 210 may be responsible for performing such router tasks as routing table computations and network management. It may include one or more microprocessor integrated circuits selected from complex instruction set computer ("CISC") integrated circuits, reduced instruction set computer ("RISC") integrated circuits, or other commercially available processor integrated circuits. Non-volatile RAM and/or ROM may also form a part of CPU 210. Those of ordinary skill in the art will recognize that there are many alternative ways in which such memory can be coupled to the system.

The interfaces 220 and 230 are typically provided as interface cards. Generally, they control the transmission and reception of data packets over the network, and sometimes support other peripherals used with router 130. Examples of interfaces that may be included in the low and medium speed interfaces 220 are a multiport communications interface 222, a serial communications interface 224, and a token ring interface 226. Examples of interfaces that may be included in the high speed interfaces 230 include a fiber distributed data interface ("FDDI") 232 and a multiport Ethernet interface 234. Each of these interfaces (low/medium and high speed) may include (1) a plurality of ports appropriate for communication with the appropriate media, and (2) an independent processor, and in some instances (3) volatile RAM. The independent processors may control such communication intensive tasks as packet switching and filtering, and media control and management. By providing separate processors for the communication intensive tasks, this architecture permits the master CPU 210 to efficiently perform routing computations, network diagnostics, security functions, and other similar functions.

The low and medium speed interfaces are shown to be coupled to the master CPU 210 through a data, control, and address bus 240. High speed interfaces 230 are shown to be connected to the bus 240 through a fast data, control, and address bus 250 which is in turn connected to a bus controller 260. The bus controller functions are typically provided by an independent processor.

Although the system shown in FIG. 2 is an example of a router suitable for implementing an embodiment of the present invention, it is by no means the only router architecture on which the present invention can be implemented. For example, an architecture having a single processor that handles communications as well as routing computations would also be acceptable. Further, other types of interfaces and media known to those skilled in the art could also be used with the router.

FIG. 3 is a block diagram illustrating a model of a typical router system. As shown in FIG. 3, in the context of the present invention, a networking device such as a router 130 may be modeled as a device having a plurality of input interfaces 310a–310n, each having a corresponding input interface queue 320a–320n. Each input interface 310 receives a stream 330a–330n of data packets 340a–340z, with each data packet 340 typically arriving at a variable rate and typically having a variable length (usually measured in bytes). It should be noted that the average data packet arrival rate on each interface 310a–310n is typically variable over time, and that the short-term and long-term average data packet arrival rate typically varies across the interfaces 310a–310n as well.

As each new data packet 340 arrives on an interface 310k, it is written into a corresponding input interface queue 320k, waiting for its turn to be processed. Scheduling logic 350 determines the order in which input interfaces 310a–310n should be "polled" to find out how many data packets (or equivalently, how many bytes of data) have arrived on a given interface 310k since the last time that interface 310k was polled. Scheduling logic 350 also determines the amount of data that should be processed from a given interface 310k during each "polling round."

In a typical router, scheduling logic 350 may operate in a "round robin" fashion in a continuous cycle of "polling rounds," using a process which can be described as follows. Upon the arrival of a new packet 340i on a particular interface 310k, a device driver sends an interrupt request to the router's CPU, discussed earlier. If the CPU is idle, it will immediately start to process the new packet. If the CPU is busy with a low priority process, the Operating System ("OS") performs a context switch to swap out the low priority process and starts to process the packet. Otherwise, a receiving ("RX") interrupt may be set for input interface 310k while waiting to be handled. Later, when the CPU can service this interrupt, it polls all of the input interface queues 320a–320n in a static and predetermined sequence (e.g., in the order shown in FIG. 3).

During a typical polling process, for each input interface queue 320k having one or more packets stored in the queue at the time that input interface queue 320k is polled (or equivalently, for each input interface queue 320k having its RX interrupt set), all complete packets currently stored in the queue are read out of the queue and transferred to other storage locations in the router for further processing. In this typical example, the next input interface queue in the sequence is not polled until all pending packets in the previous input interface queue have been read out of the previous input interface queue. Before moving on to the next input interface queue, the RX interrupt for the previous input interface queue is cleared. This simple polling technique does not account for packet arrival order, as many packets could have arrived on other interfaces while one input interface queue is being polled, and thus these newly arrived packets on other interfaces may have to wait for a long time before being processed. However, this technique has certain performance advantages due to locality, since all packets arriving on the same input interface typically contain the same link layer header and are likely destined for the same next hop.

In a second typical polling process, for each input interface queue 320k having one or more packets stored in the queue at the time that input interface queue 320k is polled, only one packet is read out of each queue and transferred to other storage locations in the router for further processing each time an input interface queue is polled. In this example, the next input interface queue in the sequence is polled as soon as one pending packet in the previous input interface queue has been read out of the previous input interface queue (assuming that the previous input interface queue has at least one packet pending). This technique tends to be fair between interfaces, but does not necessarily process packets in their arrival order, since the packet arrival rate on one interface may be higher than on other interfaces. Also, this technique has a higher processing overhead due to excessive polling of input interfaces.

Regardless of the specific form of scheduling logic 350 used, when scheduling logic 350 determines that a particular data packet 340i should be processed from a particular input interface queue 320k, scheduling logic 350 transfers the data packet 340i to subsequent portions of the networking device (not shown) for further processing. During this period of packet processing, when a new packet arrives on any interface, the RX interrupt for that interface is set if it is not already set, and the new packet is written into the appropriate input interface queue. Eventually, data packet 340i is written into an output queue 360, at the output of which the data packet 340i is finally transmitted from the networking device on an output interface 370. There may be multiple output interfaces with corresponding output queues, although these are not shown so as not to overcomplicate the present discussion.

A common assumption is that packet processing delay is negligible, and that the outer CPU has enough bandwidth to process packets as rapidly as they arrive on all interfaces. Consequently, care must be taken so that packets are not dropped in their input interface queues while waiting to be processed. This is partly the reason that most congestion control and traffic Quality of Service ("QoS") mechanisms known to those skilled in the art, such as Weighted Fair Queuing ("WFQ") and Random Early Detection ("RED"), have focused on managing traffic flows at output queues.

However, with the deployment of new QoS and policy-based networking techniques, packet processing is becoming more complicated. For instance, packet classification and policy-based routing require searching through an Access Control List ("ACL"), which can potentially be very time consuming and processor intensive. As is known to those skilled in the art, flow-based WFQ, on the other hand, may require searching through the queue list to determine the next packet to be sent. Moreover, as is known to those skilled in the art, routing information distribution and route calculation also take more time as the network topology becomes richer and as more complicated routing techniques, such as QoS routing, are deployed.

Thus, the combined increased CPU overhead for packet processing and routing protocols naturally increases the waiting time of packets in their input interface queues. Once an input interface queue is full, a newly arriving data packet will be dropped. As is known to those skilled in the art, packet dropping can significantly change the router behavior and related QoS and congestion control features. For example, when RED is configured, dropping packets from the interface queues can dramatically change the RED behavior. As one solution to avoid this from happening, a router may be configured with a relatively large input interface queue size.

However, when the size of an input interface queue becomes large, the sequence in which input interfaces should be polled, as well as the number of packets that should be processed from each input interface in a given polling round, immediately become an issue. The drawback to the known polling techniques described earlier is that packets stored in the last input interface queue may have to wait for a long time. This situation is unacceptable for the following reasons. First, delay-sensitive packets, such as voice packets, may experience unexpected long delays in their input queues. Second, a long waiting time in the input queue can make complementary congestion control techniques such as WFQ less accurate, since some packets may have passed their virtual departure time before they even start being processed. Third, some packets may wait much longer in their interface queues than other packets. This unfair treatment of packets introduces a large delay variance. Finally, considering the increased number of interfaces and heterogeneous link capacity in a single router platform, packets arriving at a high rate interface may be easily dropped even if the size of the input interface queues is configured to be large.

To solve these and other problems, the present invention provides a iate-based polling congestion control technique, according to which when the CPU on a router enters the polling state, the goal is to average packet delay across input interfaces so as to process the packets in their approximate arrival order irrespective of the interface on which they arrive, thus enabling QoS policies to be more effective. In contrast with existing approaches, the technique according to aspects of the present invention polls input interface queues in a dynamically recalculated sequence that is determined based on the estimated data arrival rate on each input interface. This technique not only avoids long waiting time for some delay-sensitive packets and possible packet drop from the a input interface queue, but also treats all input interfaces fairly with respect to their dynamic data arrival rate. Also, the technique according to aspects of the present invention may be combined with other complementary techniques focusing on output interface queues to significantly reduce the latency for delay-sensitive packets and to avoid packet loss. These features are important to providing end-to-end QoS to voice and video applications. These and other features and advantages of the present invention will be presented in more detail in the following specification of the invention and in the associated figures.

SUMMARY OF THE INVENTION

A rate-based congestion control technique for internetworking devices having a plurality of input interface queues is disclosed. Rate-based polling comprises estimating the data arrival on each input interface queue while in a first sampling state, and separately, while in a second polling state, using the estimated data arrival rate on each input interface queue to determine both the sequence in which the input interface queues should be polled and the number of packets to be processed from each input interface queue. While in the polling state, data packet delay is averaged across the input interface queues so as to process the packets in their approximate arrival order irrespective of the input interface queue on which they arrive, thus enabling Quality of Service policies to be more effective. This is achieved by processing data from each input interface at a rate that is proportional to the data arrival rate at each input interface. Rate-based polling reduces possibly lengthy delay of a packet in an input interface queue, and also avoids possible packet loss caused by long waiting time of data packets in an input interface queue with limited buffer space.

BRIEF DESCRIPTION OF THE DRAWINGS

The accompanying drawings, which are incorporated in and constitute a part of this specification, illustrate an embodiment of the invention and, together with the present description, serve to explain the principles of the invention.

In the drawings.

DETAILED DESCRIPTION

Those of ordinary skill in the art will realize that the following description of the present invention is illustrative only and not in any way limiting. Other embodiments of the invention will readily suggest themselves to such skilled persons, having the benefit of this disclosure. Reference will now be made in detail to an implementation of the present invention as illustrated in the accompanying drawings. The same reference numbers will be used throughout the drawings and the following description to refer to the same or like parts.

Figure 1:
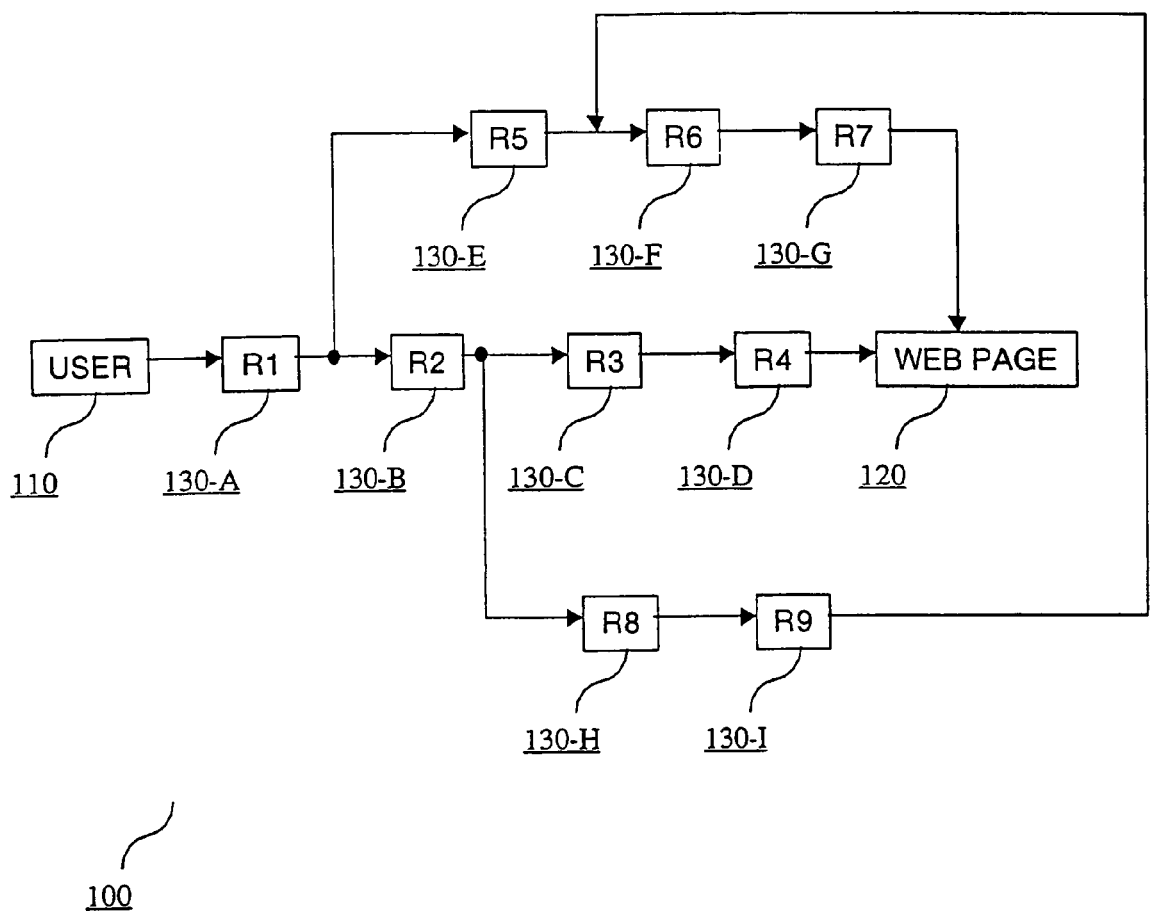
FIG. 1 is a block diagram illustrating an exemplary network connection between a user and a web page.
Figure 2:
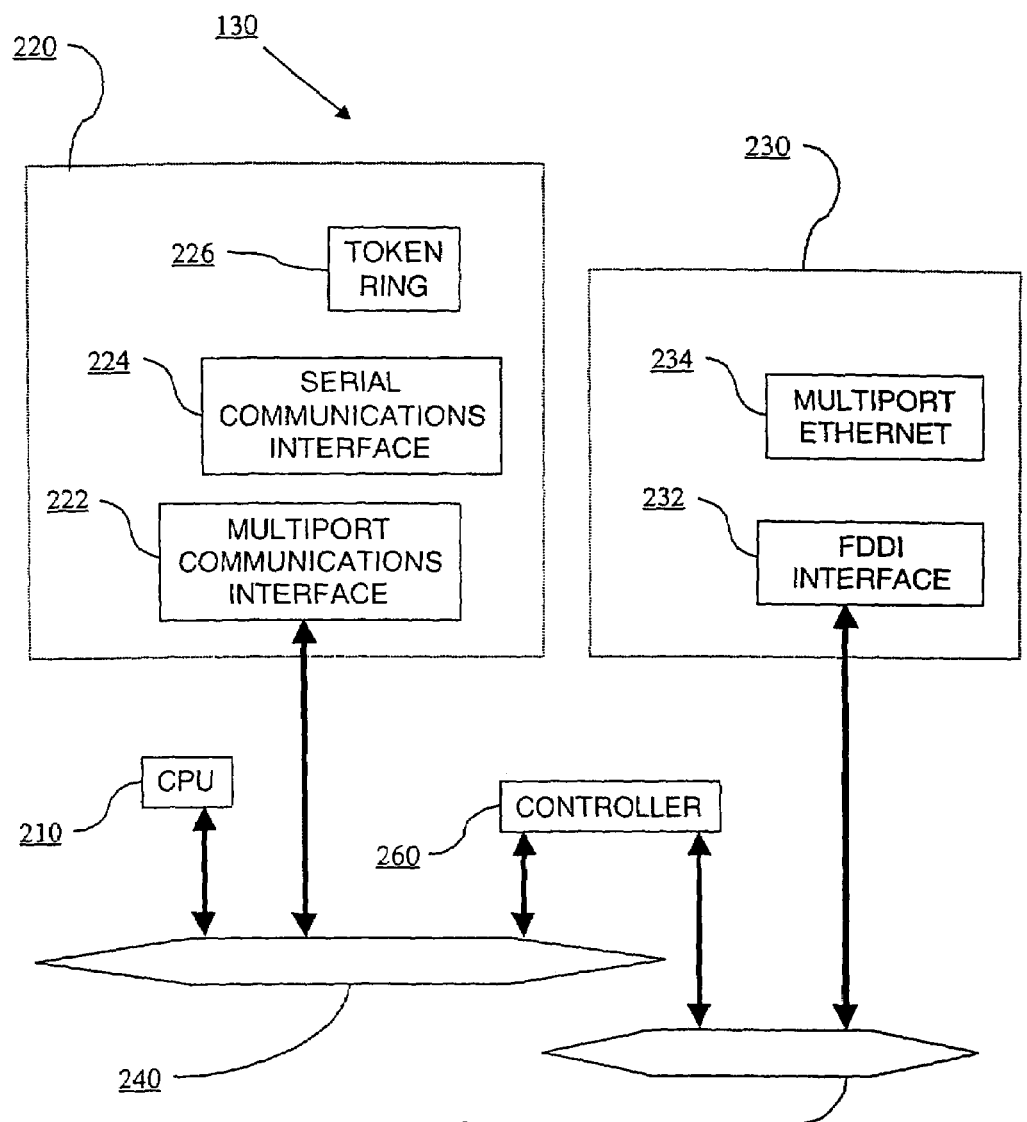
FIG. 2 is a block diagram of an exemplary router suitable for implementing an embodiment of the present invention.
Figure 3:
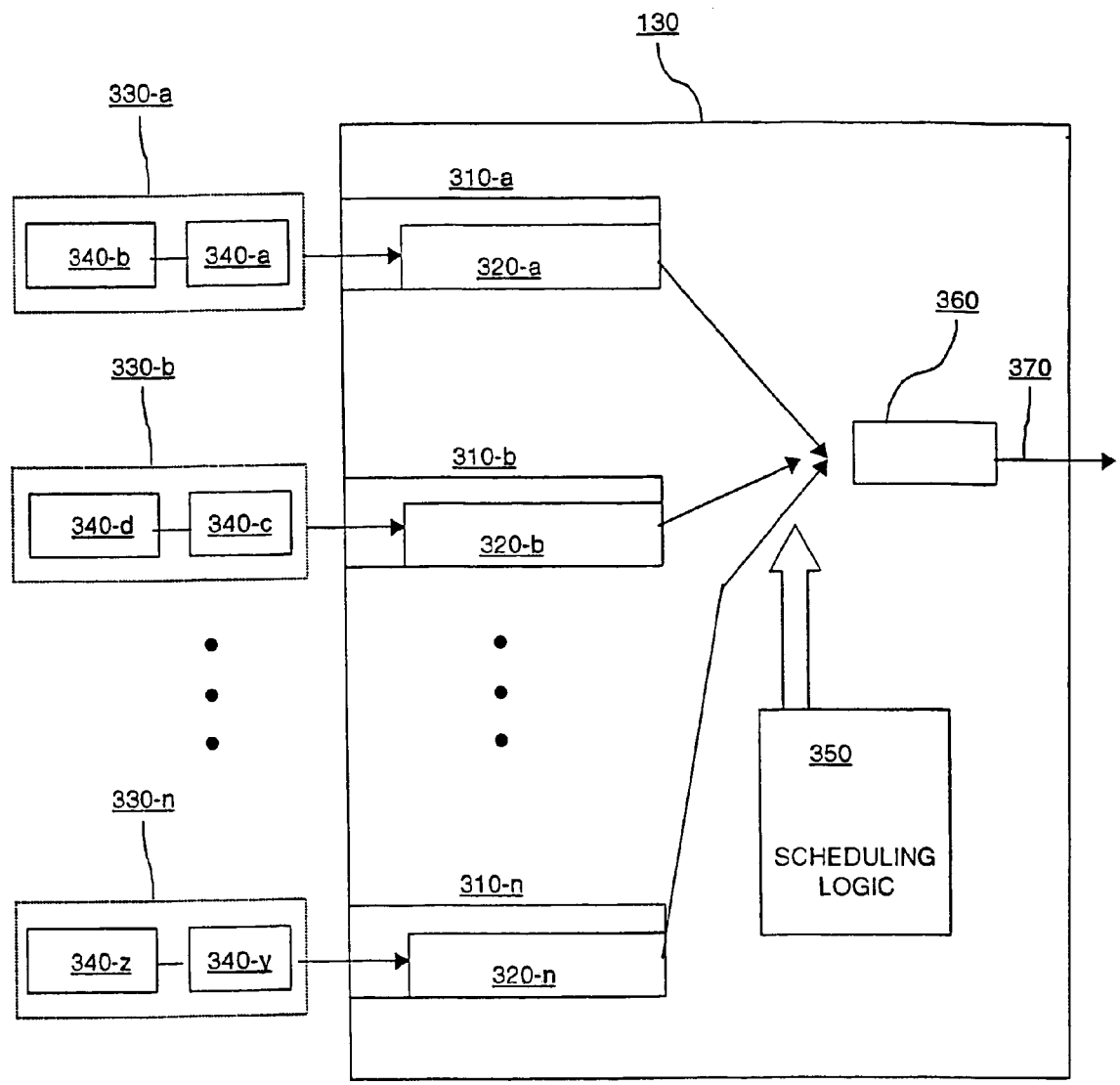
FIG. 3 is a block diagram illustrating a packet processing model in a typical router having multiple input interfaces.
Figure 4:
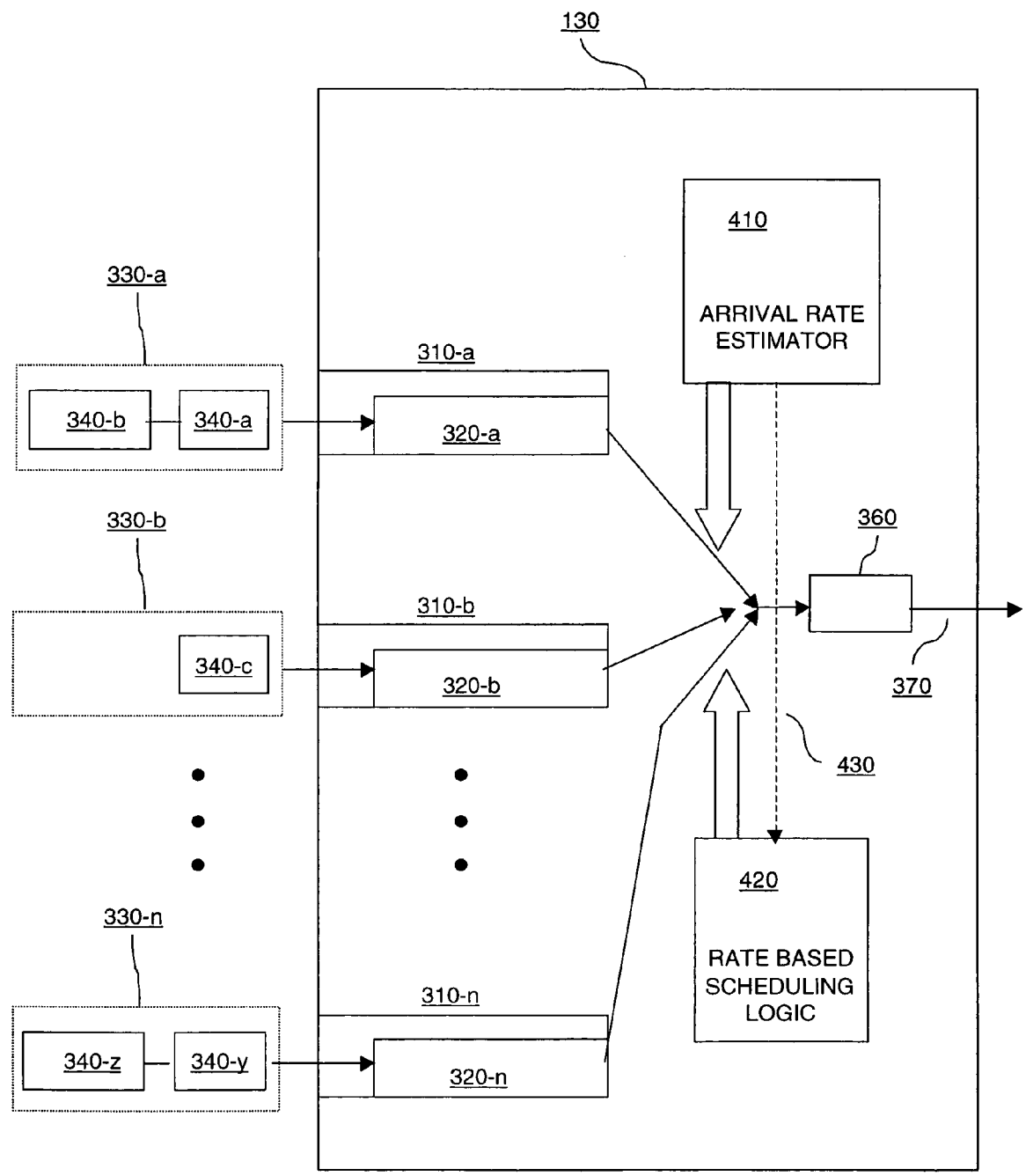
FIG. 4 is a block diagram illustrating a packet processing model in a router implementing an embodiment of the present invention.

FIG. 4 is a block diagram illustrating a packet processing model in a router implementing an embodiment of the present invention. In one embodiment, the proposed technique provides two interrelated functions: (1) estimating data arrival rate on each input interface queue, and (2) using the estimated arrival rate on each input interface queue to determine the sequence in which input interface queues should be polled and the number of packets to be processed from each input interface queue. In contrast to typical routers known by those skilled in the art, the model shown in FIG. 4 performs these functions by adding an arrival rate estimator 410, and by replacing the typical scheduling logic 350 shown in FIG. 3 with rate based scheduling logic 420, which receives data rate arrival estimates from arrival rate estimator 410 via communication path 430.

As will be described in subsequent sections of this document, the model shown in FIG. 4 may be implemented in various ways, depending on the requirements of each particular implementation. First, an embodiment will be described in which a single processor is available to act as both the arrival rate estimator 410 and as rate based scheduling logic 420.

To determine the sequence in which input interface queues should be polled and the number of packets to be processed from each input interface queue during each polling round by rate based scheduling logic 420, the data arrival rate on each input interface queue must first be estimated. One data arrival rate model that can be used for each input interface queue is its link capacity. For example, as is known to those skilled in the art, an OC3 link has a link capacity of 155 Mbits/sec, while Ethernet typically has a link capacity of 10 Mbits/sec. For example, using the static link capacity for these two types of input interfaces as an estimate of data arrival rate, an OC3 interface would be polled more frequently than an Ethernet interface. However, simply using the static link capacity as the data rate for determining the sequence in which input interface queues should be polled is insufficient, because an interface with a high link capacity can be idle, while an interface with a low link capacity can be very busy. A measurement based-approach to estimate the arrival rate of data on each input interface queue is therefore preferred.

Figure 5:
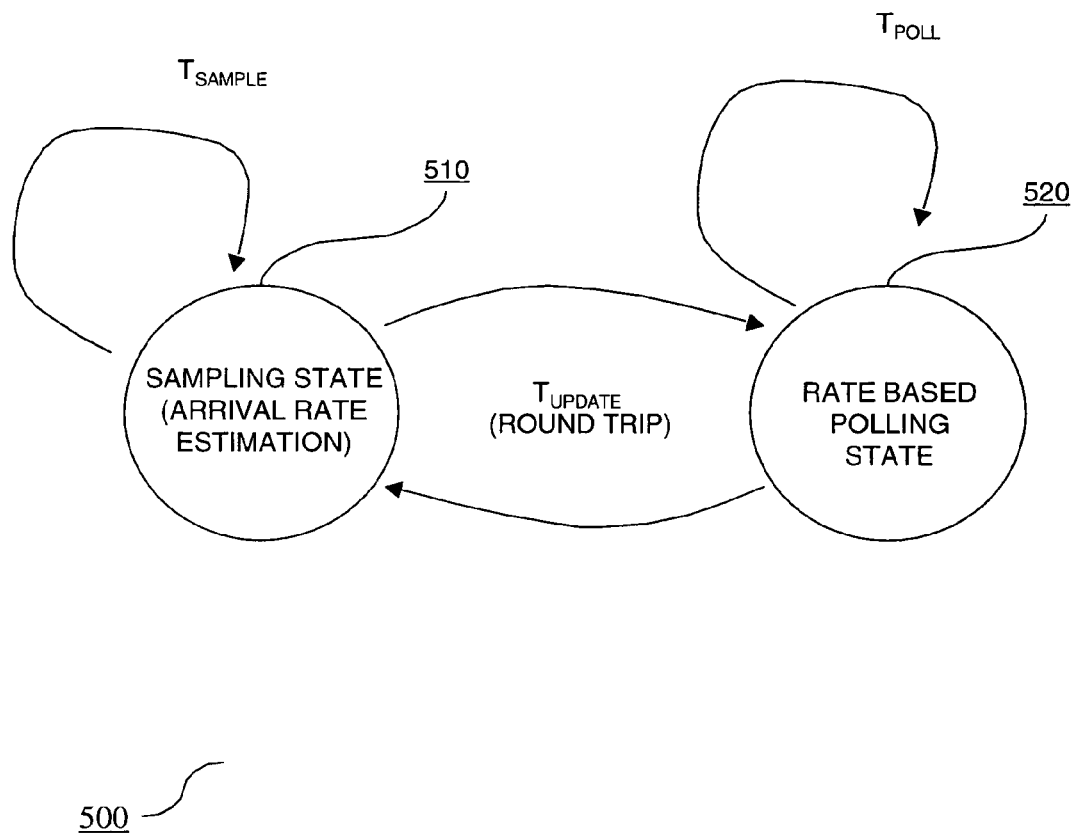
FIG. 5 is a state transition diagram illustrating an embodiment of the present invention in which a single processor is available to act as both the arrival rate estimator and as the rate based scheduling logic.

FIG. 5 is a state transition diagram 500 illustrating an embodiment of the present invention in which a single processor is available to act as both the arrival rate estimator 410 and as the rate based scheduling logic 420 of FIG. 4. As shown in FIG. 5, in the context of this embodiment of the present invention, the processor can be thought of as dividing its time between a first sampling state 510 and a second rate based polling state 520. During a time interval denominated as $T_{SAMPLE}$, the processor operates in the sampling state 510. Regardless of the particular implementation, the purpose of sampling state 510 is to generate a new set of estimated data arrival rates, $r_{new}$, for each of the n input interface queues in the network device. Once the $T_{SAMPLE}$ time interval has elapsed, the processor operates in the rate based polling state 520 during a time interval denominated as $T_{POLL}$.

Figure 6A:
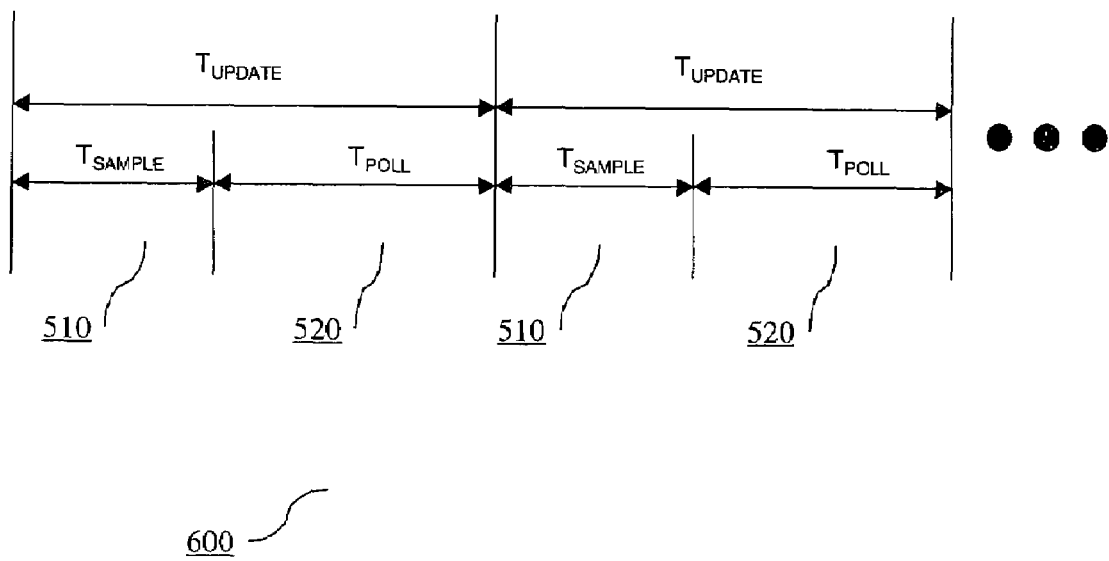
FIG. 6A is a timing diagram illustrating a continuous cycle of state transitions between a first sampling state and a second rate based polling state in one embodiment of the present invention.

While in the rate based polling state, the processor uses the updated data arrival rate estimates for each interface that were obtained during the previous sampling state 510 to determine the sequence in which the input interface queues should be polled and the number of packets to be processed from each input interface queue. The rate based polling time interval, $T_{POLL}$, should be large enough to allow all the input interface queues to be polled during each round (i.e., during each $T_{POLL}$ time interval). Also, because performance advantages according to aspects of the present invention are experienced when the processor operates in the rate based polling state 520, $T_{POLL}$ should be large in comparison to $T_{SAMPLE}$. However, $T_{SAMPLE}$ should be large enough to allow for accurate generation of data arrival rate estimates on each input interface. The actual absolute or relative values of $T_{POLL}$ and $T_{SAMPLE}$ are not critical, and should be selected depending on the requirements of each particular implementation. The sum of $T_{SAMPLE}$ and $T_{POLL}$, denominated $T_{UPDATE}$ in one embodiment, is the total time interval of each operating cycle. FIG. 6A is a timing diagram illustrating a continuous cycle 600 of state transitions between sampling state 510 and the rate based polling state 520 in one embodiment of the present invention, with the cycles repeating at time intervals equal to $T_{UPDATE}$. Nothing precludes $T_{SAMPLE}$, $T_{POLL}$, or $T_{UPDATE}$ from being dynamically recalculated or specified, if so desired in a particular implementation.

In one embodiment, an exponential averaging technique is used while in sampling state 510 to estimate the dynamic data arrival rate on each input interface queue. Given an input interface queue k (assuming that the total number of input interface queues is a positive integer n), let $t_k$ and $l_k$ be the arrival time and length (in bytes), respectively, of a new data packet on this input interface queue. Then, the updated estimated data arrival rate $r_{new}$ on this input interface queue can be expressed as a function of the previous estimated data arrival rate $r_{old}$ on the same input interface queue the following equation:

$$r_{new} = \left(\left(1 - e^{\frac{-T_k}{K}}\right) \times \frac{l_k}{T_k}\right) + \left(\left(e^{\frac{-T_k}{K}}\right) \times r_{old}\right)$$

where $T_k = t_{k-new} - t_{k-old}$ (i.e., the difference in arrival times between the current data packet and the previous data packet on a given input interface), and where K is a constant. Upon system initialization, the value of $r_{old}$ for each input interface queue can be reset to zero or set to an estimated value (e.g., the static link capacity of the input interface multiplied by a constant factor). Using the factor:

$$\left(e^{\frac{-T_k}{K}}\right)$$

as the averaging weight instead of using a constant can reflect more closely a fluid averaging process which is independent of the packetizing structure. As is known to those skilled in the art, if a constant averaging weight is used, the estimated rate will be sensitive to the packet length distribution, and there are pathological cases where the estimated rate differs from the real arrival rate by a variable factor. The choice of K presents several tradeoffs. While a small K increases the system responsiveness to rapid rate fluctuations, a large K better filters the noise and avoids potential system instability. The value of K should be chosen in accordance with the requirements of each particular application.

Although the above equations indicate that the estimated data arrival rate on each input interface queue is updated every time a new packet arrives on an input interface, the rate used to poll each input interface queue, $P_k$, may be updated using a coarser time scale. For this purpose, the $T_{UPDATE}$ parameter is used, which specifies the polling rate update interval (i.e., the time allocated for each polling round). Thus, the polling rate $P_k$ for a given input interface k is updated every interval of duration $T_{UPDATE}$ based on the current new estimated rate $r_{new}$ for that input interface. Upon system initialization, the value of $P_k$ should be set to a default, non-zero value that is appropriate for each input interface.

There are at least three different possible methods to implement exponential rate estimation according to embodiments of the present invention. First, as is known to those skilled in the art, an Application Specific Integrated Circuit ("ASIC") or similar hardware device can be used to count the number of bytes in each incoming data packet and calculate the exponential averaging described above.

Second, the exponential averaging calculations can be implemented in software. As described earlier, one possible software implementation method can be described as a "phased" approach which maintains two states as shown in FIGS. 5 and 6A: a sampling state and a rate-based polling state. Another software implementation method is a "continuous" approach, where both sampling and polling occur simultaneously but still independently. This method is described in more detail in subsequent sections of this document.

Third, the exponential average calculations can be implemented by using a separate software queue for each input interface, and by immediately handling an RX interrupt by moving the newly arriving packet out of the input interface to the appropriate software queue. Rate-based polling as described above can then be applied for each such interface software queue.

In one embodiment, while in the sampling state, all input interface queues are polled in a predetermined static sequence to compute the packet arrival rate on each input interface queue. It should be noted that when the CPU polls a particular input interface queue, there may be zero or more newly arrived data packets waiting in that input interface queue. Therefore, the estimated data arrival rate $r_{new}$ on each input interface queue is computed by adding the lengths of all the new data packets that have arrived on an input interface queue since the last time that particular input interface queue was polled, and by dividing that sum by the time that has elapsed since the previous time that particular input interface queue was polled.

Figure 6B:
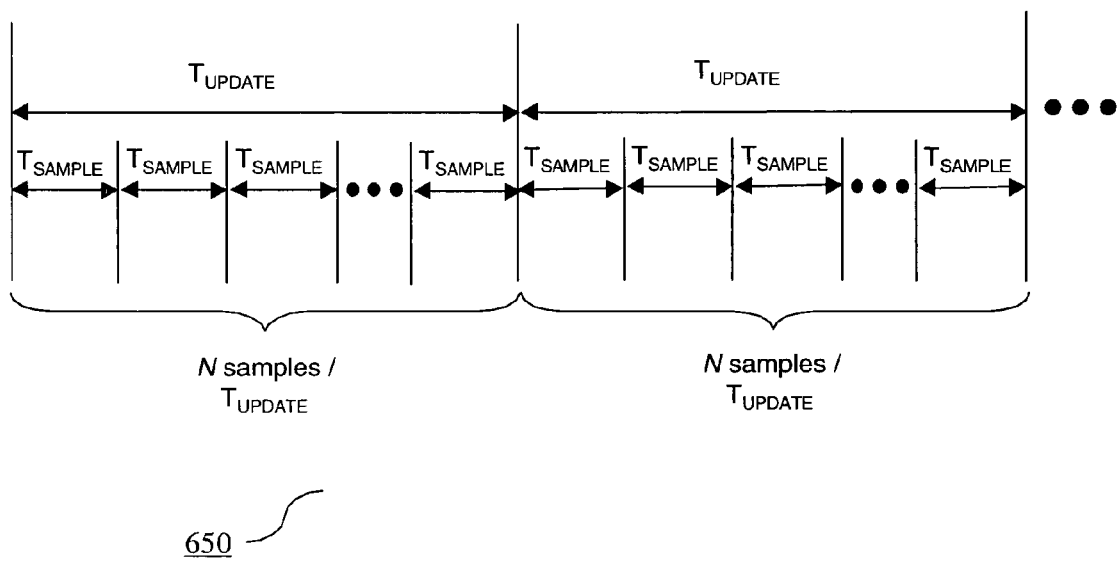
FIG. 6B is a timing diagram illustrating a continuous cycle of state transitions in which sampling and polling occur simultaneously and independently according to one embodiment of the present invention.

In another embodiment, both sampling and polling occur simultaneously and independently as follows. In this "continuous" approach, the samples themselves are spread across the entire $T_{UPDATE}$ period at regular intervals (e.g., $T_{SAMPLE}$), meaning that there is exactly one sample every $T_{SAMPLE}$ interval (i.e., the time interval after which $r_{new}$ is updated for all input interfaces) and that there are N such samples within each $T_{UPDATE}$ interval. At the end of a $T_{UPDATE}$ interval, $P_k$ is updated based on $r_{new}(N)$. This is illustrated in FIG. 6B, which shows a timeline 650 with exactly one sample every $T_{SAMPLE}$ interval and N such samples within each $T_{UPDATE}$ interval. For example, if $T_{UPDATE}$ is 100 ms and $T_{SAMPLE}$ is 1 ms, then there would be 100 samples, with one sample every 1 ms distributed across the entire 100 ms $T_{UPDATE}$ period.

The key to this observation is that at the end of each sampling interval, the CPU controlling all the input interface queues accounts for any new data packets that have arrived on each interface queue waiting to be processed and for any new data packets that have been processed from each input interface queue since the end of the previous sampling interval. The packets that are accounted for in the current sampling interval that are not yet processed can either be marked as accounted for or moved to intermediate hardware or software interface queues for subsequent processing. Preferably, the packets are not processed during the sampling state, because the time required to process the packets would affect the estimated data arrival rates on the input interface queues.

The timers for $T_{SAMPLE}$ and $T_{UPDATE}$ may be implemented either using hardware or software timers. The sampling activity proceeds completely independently of all other activities, including the packet processing activity in a router implementation. It should be noted that smaller values of $T_{SAMPLE}$ lead to aggressive sampling with high sensitivity to actual arrival rates (and higher processing overhead), while larger values lead to relaxed sampling with low sensitivity to actual arrival rates but less processing overhead.

In either case, $T_{UPDATE}$ should be chosen such that there are enough data packets waiting in each input interface queue during each sampling interval, so as to provide better estimates of data arrival rates on each input interface queue. A method whereby samples are interleaved across the entire $T_{UPDATE}$ period provides a better estimate of data arrival rates than taking all the samples using a phased approach as suggested by FIGS. 5 and 6 (i.e., taking back-to-back samples in the sampling phase, for example by taking all 100 samples during the first few milliseconds of a 100 ms period) and then switching over to the polling phase. According to the improved "continuous" implementation shown in FIG. 6B, the sampling state is completely independent of the polling state, with the sampling state possibly being performed by hardware other than the processor responsible for executing the polling state. At specified intervals, the sampling state hardware (e.g., the arrival rate estimator 410 shown in FIG. 4) provides updated $r_{new}$ values for all the input interfaces to the polling state hardware (e.g., the rate based scheduling logic shown in FIG. 4) via a communication link such as link 430 shown in FIG. 4. These updated $r_{new}$ values form the basis for new $T_k$ values that will be used to determine the time at which each of the n input interfaces should be polled next.

To determine how many packets to process from an input interface queue during each polling round, another parameter is needed, which is the maximal number of bytes allowed to be processed from each input interface queue at any given time. This parameter is denominated as B. The number of bytes ($rem_k$) that are not processed in a round will be credited to next polling round of the same input interface queue interface by moving the time $T_{new}$ forward by ($rem_k/P_k$) units. Thus, the time at which a given input interface queue k should be polled next is given by:

$$T_{new} = T_{old} + \left( \frac{(B - rem_k)}{P_k} \right)$$

With these $T_{new}$ values (one for each of the n input interface queues), an input interface queue polling sequence is defined, which is ordered according to increasing values of $T_{new}$. Thus, input interface queues are polled sequentially according to the input interface queue polling sequence defined by the ordered list of T values. In one embodiment, when the input interface queues are to be polled, the process proceeds as shown in FIG. 7.

Figure 7:
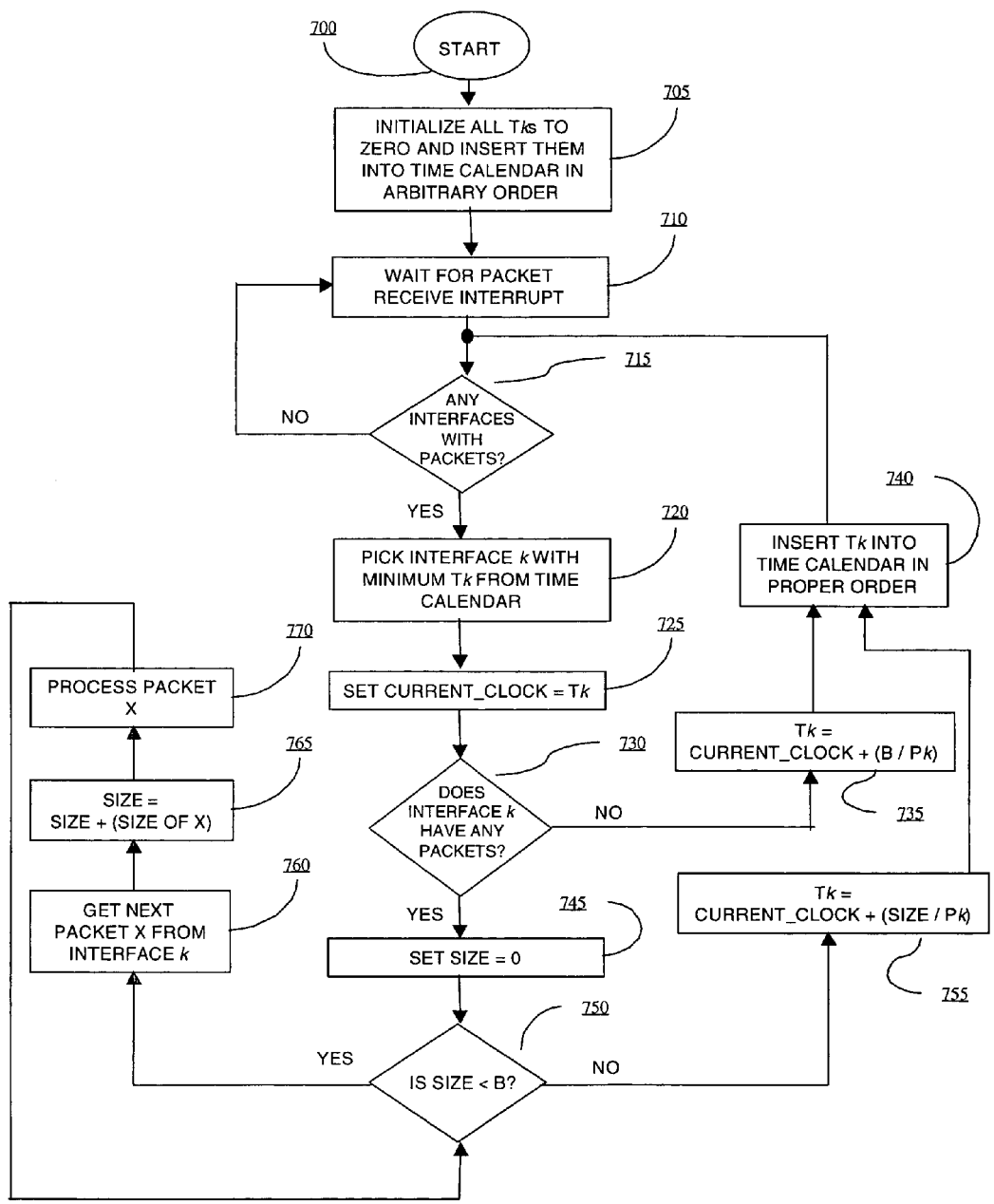
FIG. 7 is a flow chart illustrating a rate based input interface polling method in accordance with one embodiment of the present invention.

FIG. 7 is a flow chart illustrating a rate-based input interface polling method in accordance with one embodiment of the present invention. As shown in FIG. 7, the process starts at step 700, and at step 705, all of the $T_{new}$ values for all n input interface queues are initialized to zero and inserted into a time calendar in an arbitrary default order. Those skilled in the art will recognize that a time calendar is a common software concept that is suitable for implementation using insertion sorting algorithms that are well known in the art.

At step 710, the system waits for an RX interrupt, indicating that at least one new data packet has arrived on one of the input interfaces. At step 715, if none of the input interfaces have stored at least one complete data packet in its corresponding input interface queue, the process loops back to step 710.

If at least one of the input interfaces indicates that it has stored at least one complete data packet in its corresponding input interface queue, the process proceeds to step 720. At step 720, the time calendar is consulted, and the input interface queue k having the next smallest value of $T_{new}$ (denominated as $T_k$) will be selected. At step 725, the current clock is set to equal this $T_k$ value. At step 730, input interface k is polled to determine whether it has any packets stored in its input interface queue. If not, the process proceeds to step 735, where the value of $T_k$ is incremented by a factor equal to B divided by $P_k$. Then, at step 740, this new value of $T_k$ is reinserted into the time calendar in its proper location, ordered by increasing value of $T_k$'s. At this point, the process loops back to step 715. It should be noted that it is possible for the same input interface to be selected as the next input interface to be polled during consecutive loops. However, as shown in FIG. 7 and described herein, the method is designed such that another input interface will eventually be selected for polling, because the newly incremented value of $T_k$ generated in step 735 will be eventually become larger than the next smallest T value in the time calendar.

If at step 730, selected input interface k indicates that there is at least one complete data packet stored in its input interface queue, the process continues to step 745. At step 745 a variable named "size" (which is used to keep track of the number of bytes processed or otherwise accounted for from input interface k in each polling round) is initialized to zero. At step 750, the size variable is compared to B, which was mentioned earlier as a variable corresponding to the maximum number of bytes allowed to be processed from each input interface queue during each polling round. So long as the size variable is less than B, the process loops through steps 760, 765, 770, and back to step 750 for another comparison. At step 760, the next packet ("X") stored in the input interface queue for input interface queue k is read out, and its data size is determined. At step 765, the size variable is incremented by the size of packet X, in bytes. At step 770, packet X is transferred to other portions of the network device for subsequent processing.

If at step 750, the size variable is greater than or equal to B, this event indicates that the maximum number of bytes allowed to be polled from input interface queue k during each polling round has been reached or exceeded. It is possible to exceed the maximum allowed number because only complete packets are read out of each input interface queue. At step 755, the value of $T_k$ is incremented by a factor equal to the actual number of bytes transferred divided by $P_k$. Then, at step 740, this new value of $T_k$ is reinserted into the time calendar in its proper location, ordered by increasing value of T's. At this point, the process loops back to step 715.

Those skilled in the art, having the benefit of the present disclosure, will recognize that the second component of rate-based polling according to aspects of the present invention (i.e., using the estimated arrival rate of each interface to determine the sequence of interfaces from which packets should be polled and the number of packets to be polled from each interface) can be implemented either in hardware or software. Also, to reduce the overhead of searching for the next interface, instead of organizing all interfaces into a sequential list, the interfaces can be organized into a priority queue or a balanced tree (such as an AVL tree or Splay-tree).

The rate based polling techniques described herein according to aspects of the present invention may be implemented in routers or in any device having a plurality of input interface queues, where there can be different data arrival rates on each input interface queue. As is known to those skilled in the art, the program code which may be required to implement aspects of the present invention may all be stored on a computer-readable medium. Depending on each particular implementation, computer-readable media suitable for this purpose may include, without limitation, floppy diskettes, hard drives, network drives, RAM, ROM, EEPROM, nonvolatile RAM, or flash memory.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for controlling congestion in a networking device having a plurality of input interface queues, said method comprising:
   estimating, in each sampling state, a data arrival rate for each of the plurality of input interface queues with respect to incoming data packets received on corresponding input interfaces, and obtaining a set of estimated arrival rates for the plurality of the input interface queue;
   determining, for each polling state associated with a respective sampling state, the sequence in which the plurality of input interface queues should be polled and the quantity of data to be processed from each of the plurality of input interface queues each time the input interface queue is polled, using the set of estimated data arrival rates of-the plurality of input interface queues, wherein said sequence indicates an order in which each of said input interface queues should be polled during a single polling cycle, wherein the order includes an indication of where each of the input interface queues should be polled in relation to every other of the input interface queues; and
   polling, in each polling state, the plurality of the input interface queues in accordance with the determined sequence and quantity.

2. The method according to claim 1, wherein the data arrival rate on each of the plurality of input interface queues is estimated based on the static link capacity of the input interface queue.

3. The method according to claim 2, wherein said networking device is a router.

4. The method according to claim 1, wherein the data arrival rate on each of the plurality of input interface queues is estimated based on a dynamically updated measurement.

5. The method according to claim 4, wherein said networking device is a router.

6. The method according to claim 1, wherein the data arrival rate on each of the plurality of input interface queue is estimated using an exponential averaging function based on a constant factor and on the difference in arrival times between a current data packet and a previous data packet into the input interface queue.

7. The method according to claim 6, wherein said networking device is a router.

8. The method according to claim 1, wherein the data arrival rate on each of the plurality of input interface queues is estimated using an exponential averaging function based on the difference in arrival times between a current data packet and a previous data packet into the input interface queue.

9. The method according to claim 8, wherein said networking device is a router.

10. The method according to claim 1, wherein said networking device is a router.

11. The method according to claim 1, wherein said estimating the data arrival rate is performed sequentially with respect to said determining the sequence and the quantity.

12. The method according to claim 11, wherein the rate at which data are processed from each input interface queue is proportional to the data arrival rate on each input interface queue.

13. The method according to claim 1, wherein said estimating the data arrival rate is performed independently with respect to said determining the sequence and the quantity.

14. The method according to claim 13, wherein the rate at which data are processed from each input interface queue is proportional to the data arrival rate on each input interface queue.

15. The method according to claim 1, wherein the rate at which data are processed from each input interface queue is proportional to the data arrival rate on each input interface queue.

16. The method according to claim 1, wherein each sampling state has a first selected time interval, and each polling state has a second selected time interval.

17. The method according to claim 1, wherein said determining includes:
   recalculating the sequence for each polling state based on the set of estimated data arrival rates.

18. The method according to claim 1, wherein said estimating includes:
   polling each of the plurality of input interface queues in a predetermined sequence;
   obtaining a sum of lengths of new incoming data packets which have arrived on each input interface queue since the last time the input interface queue was polled; and
   calculating the estimated data arrival rate for each input interface queue based on the sum and time that elapsed since the last time the input interface queue was polled.

19. An apparatus for controlling congestion in a networking device having a plurality of input interface queues, said apparatus comprising:
   means for estimating, in each sampling state, a data arrival rate for each of the plurality of input interface queues with respect to incoming data packets received on corresponding input interfaces, and obtaining a set of estimated arrival rates for the plurality of the input interface queue;
   means for determining, for each polling state associated with a respective sampling state, the sequence in which the plurality of input interface queues should be polled and the quantity of data to be processed from each of the plurality of input interface queues each time the input interface queue is polled, using the set of estimated data arrival rates of the plurality of input interface queues, wherein said sequence indicates an order in which each of said input interface queues should be polled during a single polling cycle, wherein the order includes an indication of where each of the input interface queues should be polled in relation to every other of the input interface queues; and
   means for polling, in each polling state, the plurality of the input interface queues in accordance with the determined sequence and quantity.

20. The apparatus according to claim 19, wherein the data arrival rate on each of the plurality of input interface queues is estimated based on the static link capacity of each input interface queue.

21. The apparatus according to claim 20, wherein said networking device is a router.

22. The apparatus according to claim 19, wherein said data arrival rate on each of the plurality of input interface queues is estimated based on a dynamically updated measurement.

23. The apparatus according to claim 22, wherein said networking device is a router.

24. The apparatus according to claim 19, wherein said data arrival rate on each of the plurality of input interface queues is estimated using an exponential averaging function based on a constant factor and on the difference in arrival times between a current data packet and a previous data packet into the input interface queue.

25. The apparatus according to claim 24, wherein said networking device is a router.

26. The apparatus according to claim 19, wherein said data arrival rate on each of the plurality of input interface queues is estimated using an exponential averaging function based on the difference in arrival times between a current data packet and a previous data packet into the input interface queue.

27. The apparatus according to claim 26, wherein said networking device is a router.

28. The apparatus according to claim 19, wherein said networking device is a router.

29. The apparatus according to claim 19, wherein said means for estimating the data arrival rate operates sequentially with respect to said means for determining the sequence and the quantity.

30. The apparatus according to claim 29, wherein the rate at which data are processed from each of the plurality of input interface queues is proportional to the data arrival rate on the input interface queue.

31. The apparatus according to claim 19, wherein said means for estimating the data arrival rate operates independently with respect to said means for determining the sequence and the quantity.

32. The apparatus according to claim 31, wherein the rate at which data are processed from each of the plurality of input interface queues is proportional to the data arrival rate on the input interface queue.

33. The apparatus according to claim 11, wherein the rate at which data are processed from each of the plurality of input interface queues is proportional to the data arrival rate on the input interface queue.

34. The apparatus according to claim 19, wherein each sampling state has a first selected time interval, and each polling state has a second selected time interval.

35. The apparatus according to claim 19, wherein said means for determining includes:
   means for recalculating the sequence for each polling state based on the set of estimated data arrival rates.

36. The apparatus according to claim 19, wherein said means for estimating includes:
   means for polling each of the plurality of input interface queues in a predetermined sequence;
   means for obtaining a sum of lengths of new incoming data packets which have arrived on each input interface queue since the last time the input interface queue was polled; and
   means for calculating the estimated data arrival rate for each input interface queue based on the sum and time that elapsed since the last time the input interface queue was polled.

37. An apparatus for controlling congestion in a networking device having a plurality of input interface queues, comprising:
   an arrival rate estimator adapted to estimate, in each sampling state, a data arrival rate for each of the plurality of input interface queues with respect to incoming data packets received on corresponding input interfaces, and to obtain a set of estimated arrival rates for the plurality of the input interface queue; and
   scheduling logic coupled to an output of said arrival rate estimator, said scheduling logic being adapted to determine, for each polling state associated with a respective sampling state, the sequence in which the input interface queues should be polled and the quantity of data to be processed from each of the plurality of input interface queues each time the input interface queue is polled based on the set of estimated arrival rates, and adapted to poll, in each polling state, the plurality of the input interface queues in accordance with the determined sequence and quantity, wherein said sequence indicates an order in which each of said input interface queues should be polled during a single polling cycle, wherein the order includes an indication of where each of the input interface queues should be polled in relation to every other of the input interface queues.

38. The apparatus according to claim 37, wherein the data arrival rate on each of the plurality of input interface queues is estimated based on the static link capacity of the input interface queue.

39. The apparatus according to claim 38, wherein said networking device is a router.

40. The apparatus according to claim 37, wherein said data arrival rate on each of the plurality of input interface queues is estimated based on a dynamically updated measurement.

41. The apparatus according to claim 40, wherein said networking device is a router.

42. The apparatus according to claim 37, wherein said data arrival rate on each of the plurality of input interface queues is estimated using an exponential averaging function based on a constant factor and on the difference in arrival times between a current data packet and a previous data packet into the input interface queue.

43. The apparatus according to claim 42, wherein said networking device is a router.

44. The apparatus according to claim 37, wherein said data arrival rate on each of the plurality of input interface queues is estimated using an exponential averaging function based on the difference in arrival times between a current data packet and a previous data packet into the input interface queue.

45. The apparatus according to claim 44, wherein said networking device is a router.

46. The apparatus according to claim 37, wherein said networking device is a router.

47. The apparatus according to claim 37, wherein said arrival rate estimator operates sequentially with respect to said scheduling logic.

48. The apparatus according to claim 47, wherein the rate at which data are processed from each of the plurality of input interface queues is proportional to the data arrival rate on the input interface queue.

49. The apparatus according to claim 37, wherein said arrival rate estimator operates independently with respect to said scheduling logic.

50. The apparatus according to claim 49, wherein the rate at which data are processed from each of the plurality of input interface queues is proportional to the data arrival rate on the input interface.

51. The apparatus according to claim 37, wherein the rate at which data are processed from each of the plurality of input interface queues is proportional to the data arrival rate on the input interface queue.

52. The apparatus according to claim 37, wherein each sampling state has a first selected time interval, and each polling state has a second selected time interval.

53. A program storage device readable by a machine, tangibly embodying a program of instructions executable by the machine to perform a method for controlling congestion in an networking device having a plurality of input interface queues, the method comprising:
estimating, in each sampling state, a data arrival rate for each of the plurality of input interface queues with respect to incoming data packets received on corresponding input interfaces, and obtaining a set of estimated arrival rates for the plurality of the input interface queue;
determining, for each polling state associated with a respective sampling state, the sequence in which the plurality of input interface queues should be polled and the quantity of data to be processed from each of the plurality of input interface queues each time the input interface queue is polled, using the set of estimated data arrival rates of the plurality of input interface queues, wherein said sequence indicates an order in which each of said input interface queues should be polled during a single polling cycle, wherein the order includes an indication of where each of the input interface queues should be polled in relation to every other of the input interface queues; and
polling, in each polling state, the plurality of the input interface queues in accordance with the determined sequence and quantity.

54. The program storage device according to claim 53, wherein the data arrival rate on each of the plurality of input interface queues is estimated based on the static link capacity of the input interface queue.

55. The program storage device according to claim 53, wherein the data arrival rate on each of the plurality of input interface queues is estimated based on a dynamically updated measurement.

56. The program storage device according to claim 53, wherein the data arrival rate on each of the plurality of input interface queue is estimated using an exponential averaging function based on a constant factor and on the difference in arrival times between a current data packet and a previous data packet into the input interface queue.

57. The program storage device according to claim 53, wherein the data arrival rate on each of the plurality of input interface queues is estimated using an exponential averaging function based on the difference in arrival times between a current data packet and a previous data packet into the input interface queue.

58. The program storage device according to claim 53, wherein said networking device is a router.

59. The program storage device according to claim 53, wherein said estimating the data arrival rate is performed sequentially with respect to said determining the sequence and the quantity.

60. The program storage device according to claim 53, wherein said estimating the data arrival rate is performed independently with respect to said determining the sequence and the quantity.

61. The program storage device according to claim 53, wherein the rate at which data are processed from each input interface queue is proportional to the data arrival rate on each input interface queue.

62. The program storage device according to claim 53, wherein each sampling state has a first selected time interval, and each polling state has a second selected time interval.

63. A method for controlling congestion in a networking device having a plurality of input interface queues, said method comprising:
estimating a data arrival rate for each of the plurality of input interface queues with respect to incoming data packets received on corresponding input interfaces, and obtaining a set of estimated arrival rates for the plurality of the input interface queue;
determining a sequence in which the plurality of input interface queues should be polled and a quantity of data to be processed from each of the plurality of input interface queues each time the input interface queue is polled, using the set of estimated data arrival rates of the plurality of input interface queues, wherein said sequence indicates an order in which each of said input interface queues should be polled during a single polling cycle, wherein the order includes an indication of where each of the input interface queues should be polled in relation to every other of the input interface queues;

polling the plurality of the input interface queues in accordance with the sequence and the quantity determined in said determining; and updating the sequence and the quantity used in said polling by repeating said estimating, said determining, and said polling with a desired cycle.

64. The method according to claim 63, wherein said estimating a current data arrival rate uses a previous data arrival rate estimated in a previous sampling state.

65. The method according to claim 63, wherein said sampling is performed during a first selected time interval, and said determining and said polling are performed during a second selected time interval.

66. The method according to claim 63, wherein said estimating includes:

polling each of the plurality of input interface queues in a predetermined sequence;

obtaining a sum of lengths of new incoming data packets which have arrived on each input interface queue since the last time the input interface queue was polled; and calculating the estimated data arrival rate for each input interface queue based on the sum and time that elapsed since the last time the input interface queue was polled.

67. An apparatus for controlling congestion in a networking device having a plurality of input interface queues, said apparatus comprising:

means for estimating a data arrival rate for each of the plurality of input interface queues with respect to incoming data packets received on corresponding input interfaces, and obtaining a set of estimated arrival rates for the plurality of the input interface queue;

means for determining a sequence in which the plurality of input interface queues should be polled and a quantity of data to be processed from each of the plurality of input interface queues each time the input interface queue is polled, using the set of estimated data arrival rates of the plurality of input interface queues, wherein said sequence indicates an order in which each of said input interface queues should be polled during a single polling cycle, wherein the order includes an indication of where each of the input interface queues should be polled in relation to every other of the input interface queues;

means for polling the plurality of the input interface queues in accordance with the sequence and the quantity determined in said determining; and means for updating the sequence and the quantity used in said polling by repeating said estimating, said determining, and said polling with a desired cycle.

68. The apparatus according to claim 67, wherein said means for estimating uses a previous data arrival rate estimated in a previous sampling state to estimate a current data arrival rate.

69. The apparatus according to claim 67, wherein said means for sampling operates during a first selected time interval, and said means for determining and said means for polling operate during a second selected time interval.

70. The apparatus according to claim 67, wherein said means for estimating includes:

means for polling each of the plurality of input interface queues in a predetermined sequence;

means for obtaining a sum of lengths of new incoming data packets which have arrived on each input interface queue since the last time the input interface queue was polled; and means for calculating the estimated data arrival rate for each input interface queue based on the sum and time that elapsed since the last time the input interface queue was polled.

71. A apparatus for controlling congestion in a networking device having a plurality of input interface queues, said apparatus comprising:

an arrival rate estimator adapted to estimate, in a sampling state, a data arrival rate for each of the plurality of input interface queues with respect to incoming data packets received on corresponding input interfaces, and to obtain a set of estimated arrival rates for the plurality of the input interface queue; and scheduling logic coupled to said arrival rate estimator, said scheduling logic adapted to determine a sequence in which the plurality of input interface queues should be polled and a quantity of data to be processed from each of the plurality of input interface queues each time the input interface queue is polled, using the estimated the set of data arrival rates of the plurality of input interface queues, and adapted to poll the plurality of the input interface queues in accordance with the determined sequence and the determined quantity, said scheduling logic updating the sequence and the quantity for each polling sate using an updated arrival rate estimated in a previous sampling state, wherein said sequence indicates an order in which each of said input interface queues should be polled during a single polling cycle, wherein the order includes an indication of where each of the input interface queues should be polled in relation to every other of the input interface queues.

72. The apparatus according to claim 71, wherein said arrival rate estimator uses a previous data arrival rate estimated in a previous sampling state to estimate a current arrival rate.

73. The apparatus according to claim 71, wherein said arrival rate estimator operates during a first selected time interval, and said scheduling logic operates during a second selected time interval.

74. The program storage device according to claim 71, wherein said estimating includes:

polling each of the plurality of input interface queues in a predetermined sequence;

obtaining a sum of lengths of new incoming data packets which have arrived on each input interface queue since the last time the input interface queue was polled; and calculating the estimated data arrival rate for each input interface queue based on the sum and time that elapsed since the last time the input interface queue was polled.

75. A program storage device readable by a machine, tangibly embodying a program of instructions executable by the machine to perform a method for controlling congestion in an networking device having a plurality of input interface queues, the method comprising:

estimating a data arrival rate on each of the plurality of input interface queues with respect to incoming data packets received on corresponding input interfaces, and obtaining a set of estimated arrival rates for the plurality of the input interface queue;

determining a sequence in which the plurality of input interface queues should be polled and a quantity of data to be processed from each of the plurality of input interface queues each time the input interface queue is polled, using the estimated data arrival rate on each of the plurality of input interface queues, wherein said sequence indicates an order in which each of said input interface queues should be polled during a single polling cycle, wherein the order includes an indication of where each of the input interface queues should be polled in relation to every other of the input interface queues;

polling the plurality of the input interface queues in accordance with the sequence and the quantity determined in said determining; and updating the sequence and the quantity used in said polling by repeating said estimating, said determining, and said polling with a desired cycle.

* * * * *